United States Patent
Chen et al.

(10) Patent No.: US 12,525,006 B2
(45) Date of Patent: Jan. 13, 2026

(54) SPECTRAL DATA AUGMENTATION FOR SINGLE DOMAIN GENERALIZATION

(71) Applicants: International Business Machines Corporation, Armonk, NY (US); Rensselaer Polytechnic Institute, Troy, NY (US)

(72) Inventors: Pin-Yu Chen, White Plains, NY (US); Amit Dhurandhar, Yorktown Heights, NY (US); Jiajin Zhang, Troy, NY (US); Hanqing Chao, Troy, NY (US); Pingkun Yan, Clifton Park, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 314 days.

(21) Appl. No.: 18/230,556

(22) Filed: Aug. 4, 2023

(65) Prior Publication Data
US 2025/0046068 A1  Feb. 6, 2025

(51) Int. Cl.
*G06V 10/82* (2022.01)
*G06V 10/776* (2022.01)
*G06V 10/80* (2022.01)

(52) U.S. Cl.
CPC ........... *G06V 10/82* (2022.01); *G06V 10/776* (2022.01); *G06V 10/80* (2022.01)

(58) Field of Classification Search
None
See application file for complete search history.

(56) References Cited

U.S. PATENT DOCUMENTS

| | | | |
|---|---|---|---|
| 12,322,165 B2* | 6/2025 | Chen | G06N 3/02 |
| 2019/0385018 A1* | 12/2019 | Ngo Dinh | G06N 3/045 |
| 2021/0192343 A1* | 6/2021 | Hwang | G06T 7/168 |
| 2022/0076074 A1* | 3/2022 | Li | G06V 10/82 |

(Continued)

FOREIGN PATENT DOCUMENTS

| | | | |
|---|---|---|---|
| CN | 109635850 A | | 4/2019 |
| CN | 111539467 A | | 8/2020 |

(Continued)

OTHER PUBLICATIONS

Shao et al., "FADS: Fourier-Augmentation Based Data-Shunting for Few-Shot Classification," IEEE Transactions on Circuits and Systems for Video Technology, vol. 34, No. 2, first published Jul. 5, 2023 (Year: 2023).*

(Continued)

*Primary Examiner* — Soo Shin
(74) *Attorney, Agent, or Firm* — Jordan Schiller; Otterstedt & Kammer PLLC

(57) ABSTRACT

A machine learning model is trained using original source domain data through empirical risk minimization and a model sensitivity map is computed. Each sensitive frequency point on the model sensitivity map is targeted. An adversarial technique is employed to generate spectral adversarial images based on the model sensitivity map and an image amplitude spectrum is augmented. The generated spectral adversarial images are mixed with the original source domain data to finetune the machine learning model and deployment of the finetuned machine learning model is facilitated.

20 Claims, 14 Drawing Sheets

(56) References Cited

U.S. PATENT DOCUMENTS

| | | | | |
|---|---|---|---|---|
| 2023/0062289 A1* | 3/2023 | Amma | ................... | G06V 10/82 |
| 2025/0078493 A1* | 3/2025 | Liu | ...................... | G06V 10/764 |

FOREIGN PATENT DOCUMENTS

| | | | |
|---|---|---|---|
| CN | 111612717 | A | 9/2020 |
| CN | 112133326 | A | 12/2020 |
| CN | 112462001 | A | 3/2021 |
| CN | 114037884 | A | 2/2022 |
| CN | 115310515 | A | 11/2022 |
| WO | 20221041941 | W | 5/2022 |

OTHER PUBLICATIONS

Zhang J, Chao H, Dhurandhar A, Chen PY, Tajer A, Xu Y, Yan P., "When Neural Networks Fail to Generalize? A Model Sensitivity Perspective," arXiv preprint arXiv:2212.00850, Dec. 1, 2022. (Grace Period Disclosure). 9 pages total.

Jiajin Zhang et al., When Neural Networks Fail to Generalize? A Model Sensitivity Perspective. Dec. 1, 2022 pp. 1-9.

Arjovsky et al., Invariant risk minimization. arXiv preprint arXiv:1907.02893. Mar. 27, 2020 pp. 1-31.

Chuang and Mroueh., Fair mixup: Fairness via interpolation. arXiv preprint arXiv:2103.06503. Mar. 11, 2021 pp. 1-15.

Koyama and Yamaguchi., When is invariance useful in an Out-of-Distribution Generalization problem? arXiv preprint arXiv:2008.01883. Nov. 25, 2021 pp. 1-28.

Krueger et al., Out-of-distribution generalization via risk extrapolation (rex). In International Conference on Machine Learning, 5815-5826. PMLR. Feb. 25, 2021 pp. 1-29.

Qiao et al., Learning to learn single domain generalization. In Proceedings of the IEEE/CVF Conference on Computer Vision and Pattern Recognition, 12556-12565. Mar. 30, 2020 pp. 1-13.

Sun et al., 2021. Certified adversarial defenses meet out-of-distribution corruptions: Benchmarking robustness and simple baselines. arXiv preprint arXiv:2112.00659. Dec. 1, 2021 pp. 1-21.

Volpi et al., Generalizing to unseen domains via adversarial data augmentation. Advances in neural information processing systems, 31. Nov. 6, 2018 pp. 1-17.

Wang et al., Augmax: Adversarial composition of random augmentations for robust training. Advances in neural information processing systems, 34: 237-250. Jan. 1, 2022 pp. 1-15.

Yang and Soatto., 2020. Fda: Fourier domain adaptation for semantic segmentation. In Proceedings of the IEEE/CVF Conference on Computer Vision and Pattern Recognition, 4085-4095.

Peter Mell and Timothy Grance, The NIST Definition of Cloud Computing, NIST Special Publication 800-145, Sep. 2011, cover, pp. i-iii and 1-3.

* cited by examiner

Algorithm 1: Spectral adversarial data augmentation.

Input: model $F$; source data $\{(x_k, y_k)\}_{k=1}^{N}$; initial perturbation level $\epsilon$; max steps $T$ and step size $\delta$; sensitivity map $M_s$.

Output: augmented images $\{\tilde{x}_k\}_{k=1}^{N}$

1: for $k \leftarrow 1$ to $N$ do
2:     Compute the original spectrum $A_{org}$, $P_{org}$ by Eq. 5
3:     Randomly initialize amplitude $A_0$ by Eq. 6
4:     for $t \leftarrow 0$ to $T$ do
5:        $x_{k,t} \leftarrow$ Clamp ($\mathcal{IFFT}[A_t, P_{org}], 0, 1$)
6:        if model prediction is changed by $x_{k,t}$ then
7:           break     ▷ Early stop for acceleration
8:        end if
9:        Update amplitude spectrum $A_t$ by Eq. 7
10:       $A_t = \text{Max}(A_t, 0,)$     ▷ constrain $A_t > 0$
11:     end for
12:     $\tilde{x}_k \leftarrow$ Clamp ($x_{k,t}, 0, 1$)
13: end for

*FIG. 8*

| Method | Target Domain | | | | Average |
|---|---|---|---|---|---|
| | Domain 1 | Domain 2 | Domain 3 | Domain 4 | |
| Method 1 | 76.90 (0.34) | 52.74 (0.23) | 27.85 (0.16) | 39.65 (0.22) | 49.29 (0.22) |
| Method 2 | 83.72 (0.68) | 49.29 (0.82) | 25.89 (1.12) | 37.31 (0.86) | 49.05 (0.78) |
| Method 3 | 77.16 (1.12) | 57.80 (0.72) | 33.81 (0.75) | 43.79 (1.67) | 53.14 (0.85) |
| Method 4 | 93.16 (0.63) | 50.98 (0.97) | 26.22 (0.89) | 37.83 (0.77) | 52.05 (0.72) |
| Method 5 | 80.24 (1.27) | 75.86 (0.84) | 63.85 (0.79) | 69.84 (1.04) | 72.45 (0.77) |
| Method 6 | 77.26 (0.77) | 60.41 (0.63) | 35.51 (0.54) | 45.32 (0.67) | 55.67 (0.61) |
| Method 7 | 78.53 (0.56) | 67.94 (0.73) | 42.55 (0.81) | 48.95 (0.97) | 59.49 (0.69) |
| Method 8 | 84.37 (0.90) | 87.77 (0.85) | 57.56 (1.67) | 62.85 (0.77) | 72.88 (0.56) |
| Method 9 | 83.95 (0.77) | 87.32 (0.91) | 62.85 (0.78) | 63.72 (0.74) | 74.45 (0.70) |
| SADA$_{2Mix}$ | 81.92 (1.05) | 80.88 (0.78) | 67.66 (0.56) | 70.65 (0.82) | 75.28 (0.68) |
| SADA$_{1Mix}$ | 89.34 (0.92) | 75.74 (0.70) | 68.34 (0.61) | 72.10 (0.77) | 76.38 (0.69) |
| SADA$_{noMix}$ | 89.29 (0.80) | 75.61 (0.66) | 68.45 (0.67) | 72.90 (0.72) | 76.56 (0.65) |

*FIG. 9A*

| Method | Source Domain | | | | Average |
|---|---|---|---|---|---|
| | Domain 1 | Domain 2 | Domain 3 | Domain 4 | |
| Method 1 | 33.52(0.47) | 57.86(0.43) | 67.84(0.51) | 25.12(0.40) | 46.09(0.32) |
| Method 2 | 42.77(0.81) | 61.89(1.02) | 67.46(0.97) | 26.43(0.83) | 51.08(0.75) |
| Method 3 | 43.49(0.94) | 63.66(0.84) | 70.08(0.77) | 32.47(1.12) | 52.43(0.79) |
| Method 4 | 46.28(0.66) | 63.20(0.97) | 26.22(0.89) | 37.83(0.77) | 52.05(0.72) |
| Method 5 | 48.27(1.12) | 72.92(0.81) | 73.81(0.71) | 54.88(1.21) | 62.47(0.82) |
| Method 6 | 45.62(0.81) | 69.47(0.83) | 73.46(0.68) | 41.67(0.82) | 57.56(0.72) |
| Method 7 | 48.22(0.68) | 70.46(0.77) | 75.67(0.78) | 43.26(1.11) | 59.40(0.69) |
| Method 8 | 50.86(0.86) | 75.82(0.80) | 75.46(1.05) | 48.90(0.85) | 62.76(0.69) |
| Method 9 | 52.27(0.77) | 76.90(0.97) | 77.80(0.79) | 53.68(0.94) | 64.99(0.88) |
| SADA$_{2Mix}$ | 52.26(0.79) | 76.98(0.78) | 76.26(0.62) | 55.91(0.78) | 65.45(0.62) |
| SADA$_{1Mix}$ | 53.18(0.84) | 77.82(0.79) | 76.94(0.91) | 57.76(0.73) | 66.43(0.74) |
| SADA$_{noMix}$ | 53.22(0.81) | 77.68(0.76) | 76.35(0.87) | 57.61(0.72) | 65.96(0.68) |

*FIG. 9B*

| Method | Corruption Category | | | | Average |
|---|---|---|---|---|---|
| | Category 1 | Category 2 | Category 3 | Category 4 | |
| Method 1 | 67.21(0.66) | 56.73(0.41) | 30.26(0.42) | 62.30(0.35) | 54.08(0.23) |
| Method 2 | 67.66(0.74) | 57.81(0.86) | 28.73(0.97) | 61.96(0.88) | 54.04(0.70) |
| Method 3 | 67.20(0.92) | 58.06(0.79) | 30.37(0.69) | 62.05(1.10) | 54.43(0.69) |
| Method 4 | 67.90(0.56) | 56.59(1.02) | 33.97(0.55) | 61.83(0.75) | 55.07(0.61) |
| Method 5 | 78.53(1.12) | 82.04(0.81) | 64.45(0.71) | 76.17(1.21) | 75.28(0.82) |
| Method 6 | 69.94(0.88) | 60.57(0.73) | 48.66(0.85) | 60.37(0.94) | 59.91(0.87) |
| Method 7 | 75.54(0.68) | 63.76(0.77) | 54.21(0.78) | 65.10(1.11) | 64.65(0.69) |
| Method 8 | 76.87(0.86) | 55.36(0.80) | 75.19(1.05) | 77.51(0.85) | 71.23(0.69) |
| Method 9 | 75.98(0.77) | 70.21(0.97) | 73.29(0.79) | 72.02(0.94) | 72.88(0.88) |
| SADA$_{2Mix}$ | 78.69(0.89) | 82.10(0.81) | 67.95(0.87) | 77.32(0.91) | 75.52(0.82) |
| SADA$_{1Mix}$ | 79.14(0.81) | 82.38(0.76) | 71.42(0.87) | 78.38(0.72) | 77.83(0.68) |
| SADA$_{noMix}$ | 79.44(0.79) | 80.68(0.70) | 70.77(0.74) | 78.42(0.68) | 77.33(0.62) |

*FIG. 9C*

| Component | Set 1 | Set 2 | Set 3 | Set 4 | Avg |
|---|---|---|---|---|---|
| SADA$_{1Mix}$ | 89.34 | 75.74 | 68.34 | 72.10 | 76.38 |
| w/o SADA | 69.62 | 53.57 | 47.16 | 49.02 | 60.27 |
| w/o Mix | 82.79 | 69.43 | 62.44 | 63.18 | 69.46 |
| w/o JS Divergence | 81.68 | 70.35 | 64.32 | 65.11 | 70.37 |

*FIG. 9D*

SPECTRAL DATA AUGMENTATION FOR SINGLE DOMAIN GENERALIZATION

STATEMENT REGARDING PRIOR DISCLOSURES BY THE INVENTOR OR A JOINT INVENTOR

The following disclosure(s) are submitted under 35 U.S.C. 102(bX1XA):

Zhang J, Chao H, Dhurandhar A, Chen P Y, Tajer A, Xu Y, Yan P., "When Neural Networks Fail to Generalize?A Model Sensitivity Perspective," arXiv preprint arXiv: 2212.00850, 2022 Dec. 1.

BACKGROUND

The present invention relates generally to the electrical, electronic and computer arts and, more particularly, to machine learning.

Deep learning models typically do not generalize well when tested on samples drawn from out-of-distribution (OoD) data. Model independent data augmentation methods are agnostic and cannot address the weakness of the models in generalization due to a lack of knowledge of the models (such as Gaussian augmentation, mixup, and the like). Conventional model-dependent data augmentation methods can only generate minor perturbations in the image space, which only trivially enhance the image appearance diversity (such as gradient-based data perturbation). Domain generalization (DG) aims to train a model to perform well in unseen domains under different distributions.

BRIEF SUMMARY

Principles of the invention provide systems and techniques for spectral data augmentation for single domain generalization. In one aspect, an exemplary method includes the operations of training, using at least one hardware device, a machine learning model using original source domain data through empirical risk minimization; computing, using the at least one hardware device, a model sensitivity map; targeting, using the at least one hardware device, each sensitive frequency point on the model sensitivity map; employing, using the at least one hardware device, an adversarial technique to generate spectral adversarial images based on the model sensitivity map and augmenting an image amplitude spectrum; mixing, using the at least one hardware device, the generated spectral adversarial images with the original source domain data to finetune the machine learning model; and facilitating deployment of the finetuned machine learning model.

In one aspect, a computer program product comprises one or more tangible computer-readable storage media and program instructions stored on at least one of the one or more tangible computer-readable storage media, the program instructions executable by a processor, the program instructions comprising training a machine learning model using original source domain data through empirical risk minimization; computing a model sensitivity map; targeting each sensitive frequency point on the model sensitivity map; employing an adversarial technique to generate spectral adversarial images based on the model sensitivity map and augmenting an image amplitude spectrum; mixing the generated spectral adversarial images with the original source domain data to finetune the machine learning model; and facilitating deployment of the finetuned machine learning model.

In one aspect, an apparatus comprises a memory and at least one processor, coupled to the memory, and operative to perform operations comprising training a machine learning model using original source domain data through empirical risk minimization; computing a model sensitivity map; targeting each sensitive frequency point on the model sensitivity map; employing an adversarial technique to generate spectral adversarial images based on the model sensitivity map and augmenting an image amplitude spectrum; mixing the generated spectral adversarial images with the original source domain data to finetune the machine learning model; and facilitating deployment of the finetuned machine learning model.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improving the technological process of machine learning by generating improved trained models that present less sensitivity to domain shift across the frequency space, thus guaranteeing better generalization performance;

novel data augmentation strategy to suppress the model sensitivity for improved single-DG;

curbs model sensitivity with targeted perturbation to the source domain data samples in the frequency space;

generation of a model sensitivity map that presents as a spectral indicator to quantify the model generalizability, which also visualizes the effect of implicit regularization, such as data augmentation;

generation of augmented pseudo-domain images that boost the model performance by suppressing the source model sensitivity map;

trained models that present less sensitivity to domain shift across the frequency space compared with other methods, thus guaranteeing better generalization performance;

alleviation of the drawbacks of prior single-DG methods by targeting model sensitivity and generating adversarial images with style variation;

compatible with and complimentary to conventional data augmentation tools;

applicable to tabular or spatial-temporal data; and employment of an adversarial technique (instead of random transformation) to directly search for hard-to-learn samples by adding specially designed perturbations to source images.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 8 is an example algorithm for the spectral adversarial data augmentation framework, in accordance with example embodiment;

FIG. 9A is a table showing the 3-run average accuracy of all the methods trained on the conventional database of handwritten digits and evaluated in each target domain, in accordance with example embodiments;

FIG. 9B is a table showing the 3-run average accuracy and (standard deviation) of models trained in each single domain, in accordance with example embodiments;

FIG. 9C is a table showing the 3-run average accuracy and (standard deviation) of models trained on the uncorrupted version of the third conventional benchmark dataset and evaluated on the third conventional benchmark dataset and on four types of corruption under the severest level 5, in accordance with example embodiments;

FIG. 9D is a table showing the performance with SADA1Mix on the first conventional benchmark dataset, in accordance with example embodiments.

Figure 1:
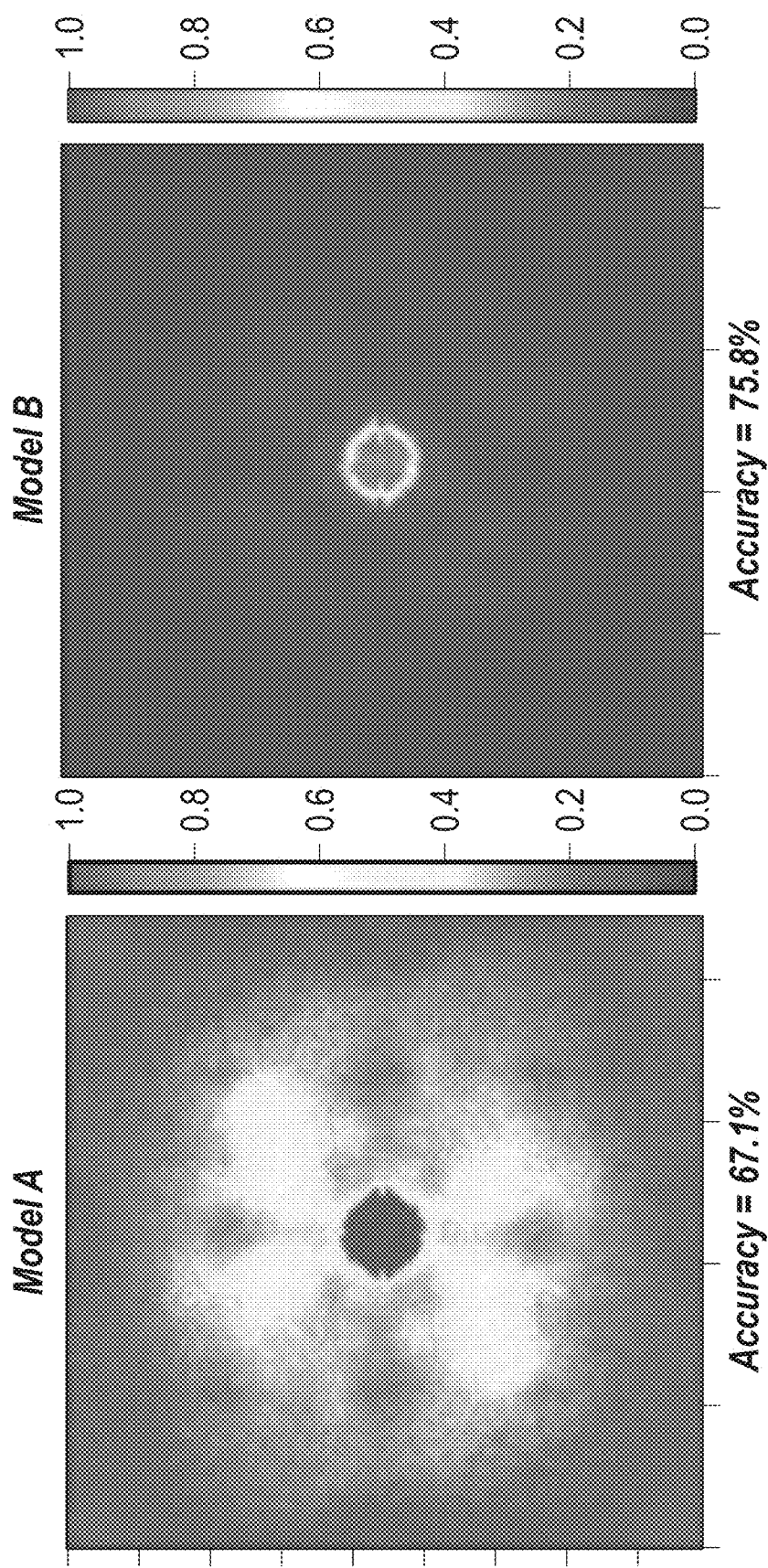
FIG. 1 presents two example sensitivity maps of two models sharing the same architecture but trained using different strategies, in accordance with example embodiments.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Domain generalization (DG) aims to train a model to perform well in unseen domains under different distributions. A more realistic scenario, namely Single Domain Generalization (Single-DG), where only a single source domain is available for training, is more challenging. To tackle this challenge, determining when neural networks fail to generalize is characterized below. A property of a model that correlates strongly with its generalization, referred to as "model sensitivity" herein, is also empirically ascertained. Based on this analysis, a strategy of spectral adversarial data augmentation to generate augmented images targeted at the highly sensitive frequencies is disclosed. Models trained with these hard-to-learn samples can effectively suppress the sensitivity in the frequency space, which leads to improved generalization performance. Extensive experiments on multiple public datasets demonstrate the superiority of exemplary embodiments of the disclosed approach, which surpasses the state-of-the-art single-DG methods by up to 2.55%. Compared to the prior art, we believe this to be the best accuracy (given similar problem setups) that can currently be obtained.

INTRODUCTION

Deep learning models may perform poorly when tested on samples drawn from out-of-distribution (OoD) data. Applications encountering OoD problems commonly involve natural domain shift or image corruptions. To tackle the problem of performance degradation in unseen domains, extensive research has been carried out on domain generalization (DG), which attempts to extend a model to unseen target domains by regularizing the model and exposing it to more data.

Based on how the source domain knowledge gets transferred to an unseen target domain, the existing DG techniques can be divided into three categories: representation learning, constrained learning, and data manipulation. The former two categories explicitly regularize a model to improve its generalizability. These approaches aim to learn domain-invariant predictors by enhancing the correlations between the domain invariant representations and the labels. It is noted that the data augmentation-based methods are actually also regularizing models, but implicitly. In example embodiments, the effect of implicit regularization of data augmentation strategies is visualized and quantified.

Most of the existing DG methods learn the representations from multiple source domains. However, in many applications, there is only one single source domain available for training. Despite the extensive literature on domain generalization, limited work deals with single source domain. In fact, many of the explicit regularization methods need multiple source domains to begin with and thus are inapplicable to the single domain setting. Data augmentation, as an effective strategy in deep learning, has shown promising performance in single domain generalization (single-DG) problems. Such methods typically apply various operations to the source domain images to generate pseudo-novel domains. Models will be trained using both the source domain images and the augmented images, with designed constraints to learn invariant representations.

Despite the popularity of data augmentation in single-DG, the existing methods suffer from two major drawbacks. They are either model agnostic or provide very limited OoD augmentation. A recent study on measuring cross-domain transferability demonstrated that the characteristics of both model and training data are important factors when quantifying the model's generalizability. However, the majority of data augmentation methods are model independent, which apply random generic image transformations to generate pseudo-domain images. Although they are helpful, those augmented images may not necessarily address the weaknesses of the models. In contrast, recent methods exploiting adversarial samples for domain generalization learn to generate such augmentations by targeting the models' weakness. However, the resulting minor perturbations to the samples in the image space only trivially enhance the appearance diversity. Therefore, these adversarial samples-based augmentation methods lead to limited generalization performance improvement.

To tackle the above-mentioned challenges in data augmentation, one or more embodiments characterize when neural networks fail in domain generalization. In other words, the model characteristics to quantify what aspects of the neural networks can reflect their generalizability is ascertained. A model sensitivity analysis approach to compute sensitivity maps as surrogates to help quantify the spectral weaknesses of the model is disclosed. FIG. 1 presents two example sensitivity maps of two models sharing the same architecture but trained using different strategies, in accordance with example embodiments. A clear correlation between the model generalization performance on an unseen target domain with the corresponding model sensitivity map was observed. The corresponding prediction accuracy of the two models on an unseen target domain shows that Model B with less spectral sensitivity generalizes better than Model A, which has much higher sensitivity. More detailed analysis and results on the sensitivity maps and their association with model generalizability are included in the experiment section below.

Figure 2:
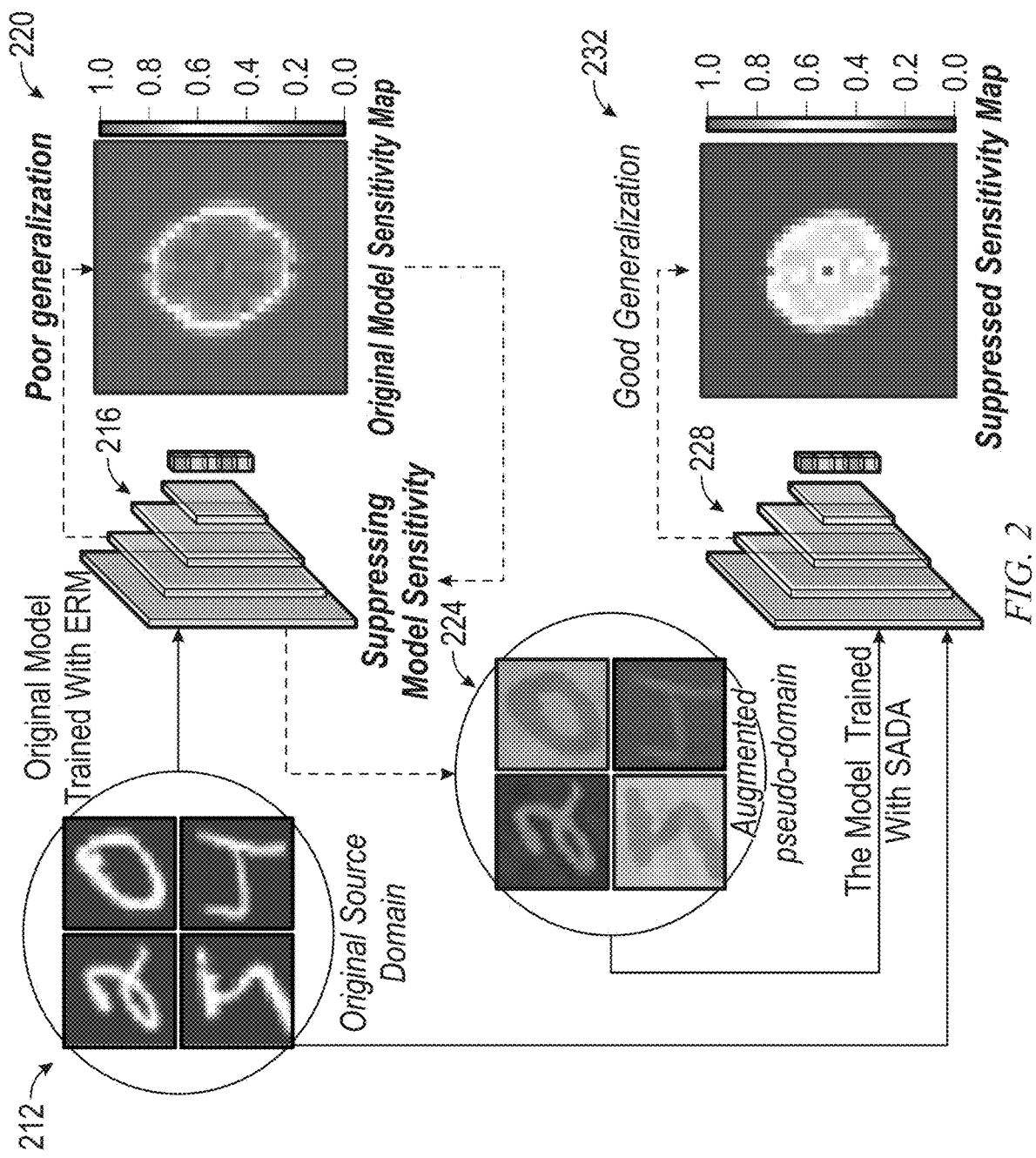
FIG. 2 illustrates an overview of the spectral adversarial data augmentation (SADA) framework, in accordance with example embodiments.

Based on the correlation between the generalization performance and model sensitivity map, a novel data augmentation strategy was designed to suppress the model sensitivity for improved single-DG. Spectral adversarial data augmentation (SADA), which curbs model sensitivity with targeted perturbation to the source domain data samples in the frequency space, is disclosed. FIG. 2 illustrates an overview of the spectral adversarial data augmentation (SADA) framework, in accordance with example embodiments. The generated model sensitivity map 232 presents as a spectral indicator to quantify the model generalizability. Augmented pseudo-domain images 224 are generated by SADA to boost the model performance by suppressing the source model sensitivity map 220. More specifically, a model 216 using the original source domain data 212 through empirical risk minimization (ERM) is first trained and then the model sensitivity map 220 is computed. Since randomly augmenting images may require generating a large number of images 224, the cost of data augmentation can be high and the following model training will be slow. To efficiently suppress the model sensitivity, instead of applying random operations, each sensitive frequency point on the map 220 is targeted and the adversarial technique is employed to generate hard-to-learn samples. Such adversarial operation of the image amplitude spectrum allows augmenting samples with more appearance variation in most cases. The generated samples 224 are then mixed with the original samples 212 to finetune the original model and generate SADA trained model 228. Compared with other methods, SADA trained models, such as the SADA trained model 228, present less sensitivity to domain shift across the frequency space, thus guaranteeing better generalization performance. Based on such observation, a quantitative measure is disclosed, which helps predict model generalizability.

In example embodiments, a spectral sensitivity map 220, 232 is introduced as an indicator to quantify the model generalizability, which also visualizes the effect of implicit regularization, such as data augmentation. In addition, SADA is disclosed to improve the model generalization performance by suppressing the highly sensitive areas in the frequency space. SADA alleviates the drawbacks of the prior single-DG methods by targeting model sensitivity and generating adversarial images 224 with style variation. A thorough empirical analysis is presented below that compares the SADA method with the baselines from multiple perspectives on public datasets.

It is worth noting that most current techniques require use of multiple domains, whereas one or more embodiments advantageously only use a single domain.

Aiming to suppress the model spectral sensitivity, exemplary embodiments instead adversarially augment the image amplitude spectrum. Exemplary embodiments were experimentally compared to typical baselines under a single-DG setting and were found to demonstrate superior performance.

Methodology

The objective of single-DG is to train a model in one source domain, that can generalize well in many unseen target domains. The source domain is denoted by $X_S=\{(x, y)\}$. $x \in \mathbb{R}^{w \times h}$ is the source image, where w and h are the width and height, respectively. y is the corresponding label. As introduced in FIG. 2, to tackle this challenge, the framework of spectral adversarial data augmentation (SADA) is disclosed to boost the model's generalizability by suppressing its spectral sensitivity. SADA first computes a model sensitivity map 220 as a surrogate of the model vulnerability in the frequency space. Then it uses the model sensitivity map 220 as guidance to synthesize spectral adversarial images 224, which encodes the model sensitivity into hard-to-learn augmentation images. The model sensitivity measurement and spectral adversarial augmentation processes are discussed in detail below.

Amplitude-Modulated Sensitivity Map

Figure 3A:
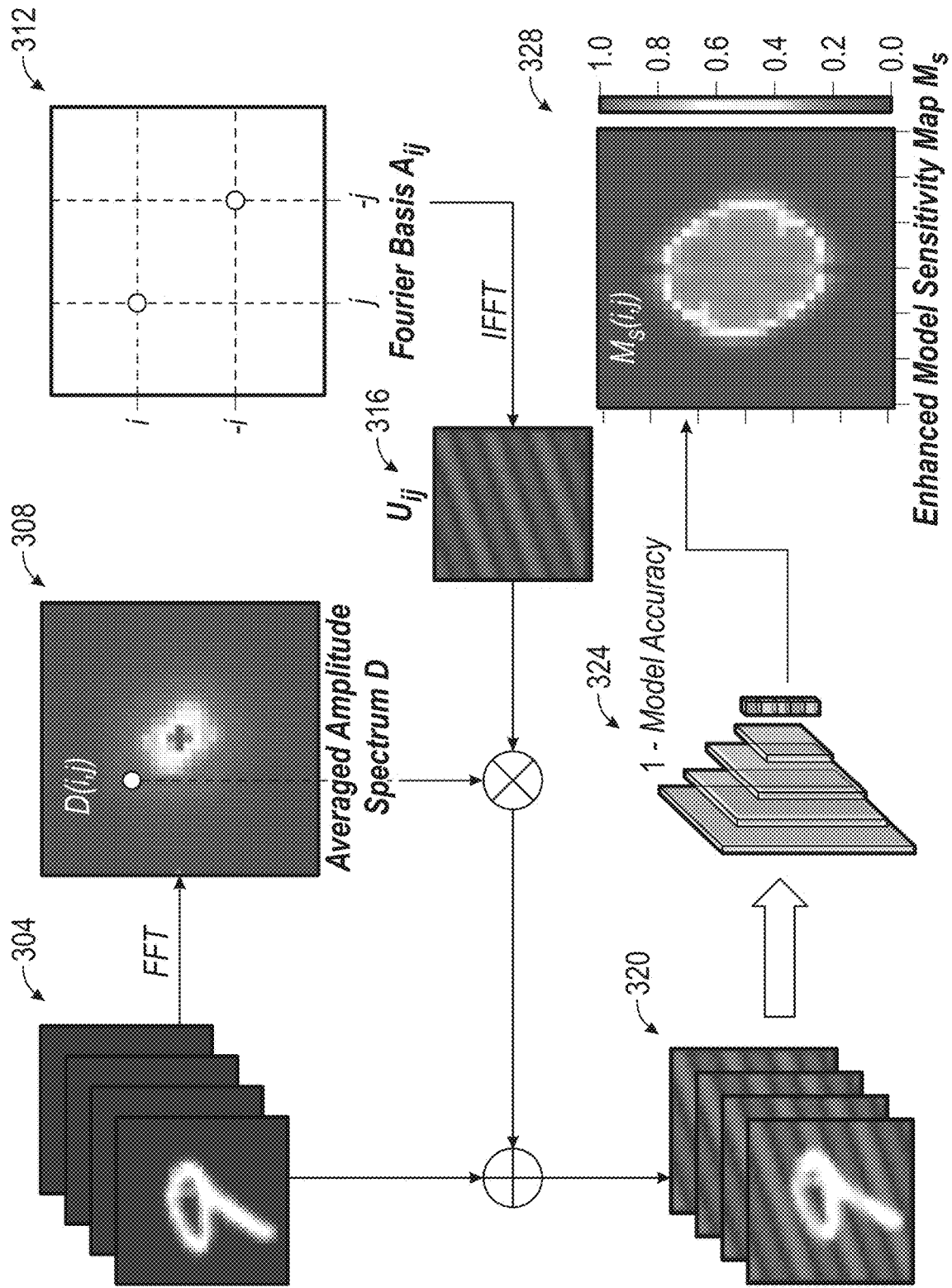
FIG. 3A illustrates an enhancing of the model sensitivity map with a source domain amplitude distribution, in accordance with example embodiments.

To quantify the model's vulnerability/weakness to the different frequency corruptions, the Fourier sensitivity analysis has previously been proposed. Briefly, a Fourier basis $A_{i,j} \in \mathbb{R}^{w \times h}$ such as Fourier basis 312 in FIG. 3A, is defined as a Hermitian matrix with only two non-zero elements at (i,j) and (−i, −j), where the origin is at the image center. A Fourier basis image $U_{i,j}$ is a real-valued matrix in the pixel space. It is defined as the $\ell_2$-normalized Inverse Fast Fourier Transform (IFFT) of $A_{i,j}$, i.e., $$U_{i,j} = \frac{IFFT(A_{i,j})}{\|IFFT(A_{i,j})\|_2},$$

such as the inverse Fourier transform 316 of the Fourier basis 312 in FIG. 3A. Perturbed images are generated by adding the Fourier basis noise $$N_{i,j} = r \cdot \epsilon \cdot U_{i,j} \qquad (1)$$

to the original image x as $x+N_{i,j}$, where $\epsilon$ is a frequency-independent constant value to control the $\ell_2$-norm of the perturbation and r is randomly sampled to be either −1 or 1. The Fourier basis noise $N_{i,j}$ only introduces perturbations at the frequency components (i,j) and (−i, −j) to the original images. The constant $\epsilon$ guarantees that images are uniformly perturbed across all frequency components. For RGB images, $N_{i,j}$ is added to each channel independently. The sensitivity at frequency (i,j) of a given model F (such as neural network 324 in FIG. 3A) trained on the source domain is defined as the prediction error rate over the whole dataset $X_S$:

$$M_{org}(i, j) = 1 - \underset{(x, y) \in X_S}{Acc} (F(x + N_{i,j}, y)), \quad (2)$$

where Acc is the model prediction accuracy. By aggregating all the model sensitivity entries $M_{org}(i,j)$ across the frequency space, a 2D model sensitivity map can be obtained as shown by the examples in FIG. 1. The lowest frequency is at the center of the map and higher frequencies are closer to the edges.

Since $\epsilon$ is a frequency-independent constant, the original model sensitivity map defined by Eq. 2 describes a model's local vulnerability by uniformly perturbing all frequency components of the source images. Instead of a uniform distribution, the amplitude spectrum of natural images generally follows a power-law distribution. Low-frequency amplitudes have much higher values than the high-frequency ones, and can vary more significantly across domains. Models generally would generalize poorly if such low-frequency variability is not presented in the training set. These observations indicate that the low-frequency components of images with large amplitude should be perturbed more significantly to truly reflect the model vulnerability with respect to the domain shift problem.

Thus, the model sensitivity map 220 is enhanced by using the source domain amplitude spectrum as a domain prior. FIG. 3A illustrates an enhancing of the model sensitivity map 308 with a source domain amplitude distribution, in accordance with example embodiments. The averaged source amplitude spectrum D is encoded into the perturbed images 320. As shown in FIG. 3A, a mean amplitude spectrum D is first computed by averaging the amplitude spectrum of all images 304 in the source domain. Then, the original Fourier basis noise $N_{i,j}$ is reformulated by $$\hat{N}_{i,j} = r \cdot D(i, j) \cdot U_{i,j} \quad (3)$$

where the frequency-independent $\epsilon$ in Eq. 1 is replaced with the $(i,j)_{th}$ entry of D to control the noise level.

Adopted from Eq. 2, the enhanced model sensitivity at frequency (i,j) is computed by evaluating the prediction error rate on the perturbed source images as by $$M_S(i, j) = 1 - \underset{(x, y) \in X_S}{Acc} (F(x + r \cdot D(i, j) \cdot U_{i,j}), y), \quad (4)$$

where F is a model trained with empirical risk minimization (ERM) by minimizing the cross entropy loss $$\mathcal{L}_{ERM} = \underset{(x, y) \in X_S}{\mathbb{E}} \ell_{CE}(F(x), y).$$

In the section entitled "Experiments" below, the enhanced model sensitivity map 328 is quantitatively compared to the original one from different perspectives.

Spectral Adversarial Data Augmentation

The model sensitivity $M_S$ describes the model spectral weakness with respect to the domain shift, which strongly correlates with the model cross-domain generalizability. The model sensitivity of certain frequencies can be suppressed if the diversity of the training data increases at those frequency elements. Random spectral perturbation to the source images may help increase the overall diversity; however, it generally lacks efficiency to sufficiently cover all potential pseudo domains. Following this direction, a spectral adversarial data augmentation (SADA) method is disclosed, which curbs model sensitivity with targeted perturbation to the source domain data samples in the spectral space. Instead of random transformation, SADA employs an adversarial technique to directly search for hard-to-learn samples by adding specially designed perturbations to the source images 304.

Figure 3B:
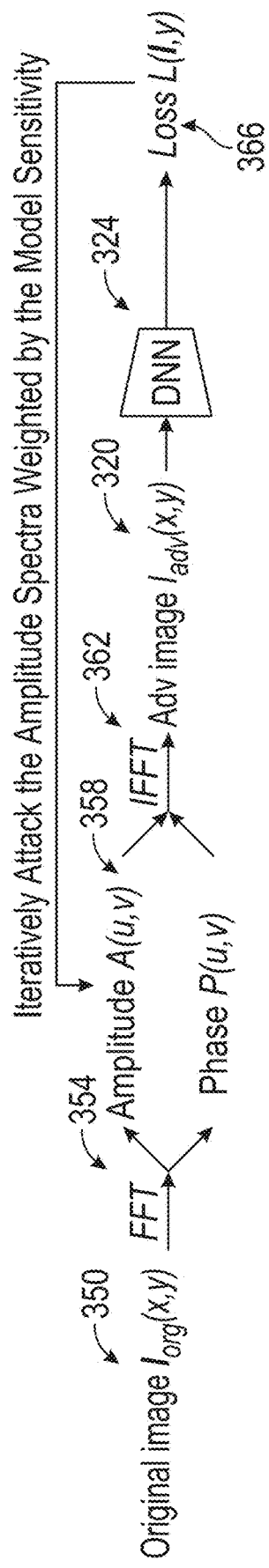
FIG. 3B is a high-level diagram of a process for generating an adversarial image, in accordance with example embodiments.

FIG. 3B is a high-level diagram of a process for generating an adversarial image, in accordance with example embodiments. In one example embodiment, a fast Fourier transform 354 is performed to transform an original image 350 into a spectral domain representation 358 (see eq. (5)) and an inverse fast Fourier transform 362 is performed to transform the spectral domain representation 358 of the image into an adversarial image 320. The adversarial image 320 is fed into the deep neural network 324 to generate a loss 366 and the loss 366 is added to the spectral domain representation 358 of the image as a perturbation to the amplitude of the spectral domain representation 358 (see eq. (6 and 7)).

The pipeline of SADA is summarized in Algorithm 1 of FIG. 8. More specifically, given a source domain image x, its spectral amplitude $A_{org}$ and phase $P_{org}$ are computed by the Fast Fourier Transform (FFT) as $$A_{org}, P_{org} = FFT[x] \quad (5)$$

Then the original amplitude spectrum $A_{org}$ is initialized with random perturbation as $$A_0 = A_{org} \odot (1 + Unif(-\epsilon, \epsilon)), \quad (6)$$

where $Unif(-\epsilon, \epsilon) \in \mathbb{R}^{w \times h}$ represents a 2D matrix with each entry sampled uniformly from $[-\epsilon, \epsilon]$, and $\odot$ denotes the Hadamard product.

To target each sensitive frequency component, as in Eq. 7, the amplitude spectrum $A_{t+1}$ is optimized iteratively by adding the $M_S$-weighted sign gradient of the cross-entropy loss to the amplitude spectrum $A_t$ with $\delta$ as the perturbation step size.

$$A_{t+1} = A_t + \delta \cdot sign\left[\frac{\partial \ell_{CE}(F(FFT[A_t, P_{org}]), y)}{\partial A_t}\right] \odot M_S \quad (7)$$

See equation (4) for the enhanced model sensitivity $M_S$. Previous studies have demonstrated that the phase spectrum retains most of the semantic structure information of the original signals, while the amplitude mainly contains the style/domain-related statistics. Since the data augmentation objective is to diversify the image styles without affecting the original semantic meaning, the amplitude spectrum is adversarially perturbed while keeping the original phase spectrum. That is, in each iteration, the augmented image is reconstructed from the updated amplitude $A_{t+1}$ and the original phase spectrum $P_{org}$. The reconstructed image is then clamped into the definition region [0, 1] by $x_{t+1}$=Clamp (FFT [$A_{t+1}$, $P_{org}$], 0, 1).

FIG. 8 thus illustrates an example algorithm for the spectral adversarial data augmentation framework, in accordance with example embodiment. In one example embodiment, the input includes the neural network, F, to be trained, source data (x,y) for training the neural network F, the initial image amplitude perturbation range $\varepsilon$, the maximum number of steps T for optimizing the image amplitude, the optimization step size $\delta$, and the model sensitivity map $M_S$ computed by equation (4). The output includes the augmented images for further improving the generalizability of the neural network F. Line 1 specifies that lines 2-10 are iterated for each data sample in ($x_k$, $y_k$) (k=1 ... N). Line 2 specifies using equation 5 to compute the original amplitude spectrum $A_{org}$ and phase spectrum $P_{org}$ of the current sample ($x_k$, $y_k$) and line 3 specifies using equation 6 to add random perturbations to $A_{org}$ to generate $A_o$. Line 4 specifies that lines 5-10 are iterated, for the current data sample ($x_k$, $y_k$), for T steps to optimize the amplitude $A_t$ (t starts from 0 and maximumly ends at T). In line 5, an inverse fast Fourier transform (IFFI) is used to reconstruct the image sample $x_{k,t}$ given the t-th step amplitude $A_t$ and the original phase spectrum $P_{org}$. The pixel value of the reconstructed image $x_{k,t}$ is controlled within the range of [0,1] by the operation of Clamp( . . . , [0,1]). At line 6, the model F is used to make predictions of the original image $x_k$ at the t-th step (generated image $x_{k,t}$) if the two predictions are different (that is, the prediction is changed by $x_{k,t}$). Line 7 specifies that, if the decision of line 6 is true, then the iterations stop and the method proceeds with line 12. In line 9, the amplitude $A_t$ is updated (optimized) using equation (7). Line 10 specifies that the pixel value of $A_t$ is controlled to always be greater than zero. (Any pixel with a value below zero will be replaced by zero.) At line 12, the pixel value of the reconstructed image $x_{k,t}$ is controlled within the range of [0,1] by the operation of Clamp( . . . , [0,1]).

Model Training

To learn invariant representations, the prediction consistency is regularized among the original image and all augmented images through a Jensen-Shannon (JS) divergence. The total training loss is $$\mathcal{L} = \mathcal{L}_{ERM} + \lambda \cdot JS(x_0, x_1, x_2, \ldots, x_n), \quad (8)$$

where $\lambda$ is the trade-off parameter and $x_1, x_2, \ldots, x_n$ are the n augmented images from the same original image $x_0$. The JS divergence is defined as $$JS(x_0, x_1, x_2, \ldots, x_n) = \frac{1}{n+1}\sum_{i=0}^{n} KL(F(x_i\|\bar{p})),$$

where KL is the Kullback-Leibler divergence, $F(x_i)$ is the model prediction probability of $x_i$ and $$\bar{p} = \frac{1}{n+1}\sum_{i=0}^{n} F(x_i).$$

Experiments

Comprehensive experiments to evaluate SADA from different perspectives are described below. Compared with prior methods, exemplary embodiments of SADA effectively improve the single-DG performance (See section entitled "Method Effectiveness.") The disclosed model sensitivity map suggests when neural networks generalize well. (See section entitled "Model sensitivity perspective.") A comparison of the data efficiency of SADA compared with other data augmentation methods is described below. (See section entitled "Data efficiency.")

Datasets

The disclosed method and other benchmarks were evaluated on three conventional benchmark datasets.

1) a first conventional benchmark dataset includes 5 domains, including a first conventional database of handwritten digits, a conventional database of images of house address numbers, a second conventional database of handwritten digits, a conventional database of digits and a conventional database of handwritten zip code digits. All the gray scale images were converted to red-green-blue (RGB) images.

2) a second conventional benchmark dataset is a more challenging domain generalization dataset including four domains, a conventional database of photographs, a conventional database of art, a conventional database of cartoons, and a conventional database of sketches. The official dataset split is followed for training validation and testing.

3) a third conventional benchmark dataset is the corrupted version of a corresponding conventional benchmark dataset by four categories of corruption, i.e., weather, blur, noise, and digital. Each corruption has 5 level severity.

Implementation Details

In all the experiments, the weighting factor was set to $\lambda$=0.25, the perturbation steps were set to T=5, the step size was set to $\delta$=0.08 and the random initialization range was set to $\epsilon$=0.2. The number of augmented images per training sample in Eq. 8 was set to 3, based on the empirical evaluation results. Three SADA variants, SADA2Mix, SADA1Mix and SADAnoMix, were also included for comparison. The symbol '#' in each subscript "#mix" indicates the number of AugMix images.

For a fair comparison with other methods, the same network architectures of the previous works were directly adopted. For the first conventional benchmark dataset, a conventional convolutional neural network was trained with stochastic gradient descent (SGD) optimizer (default settings) for 50 epochs. The initial learning rate is 0.001, which decays by 0.1 for every 20 epochs. The batch size is 128. For the second conventional benchmark dataset, a first conventional neural network is pretrained on a conventional image database and finetuned in the source domain by SGD for 80 epochs. The initial learning of 0.01 is scheduled to decay by 0.1 for every 20 epochs. The batch size is 256. For the third conventional benchmark dataset, a Wide Residual Network with 16 layers and width of 4 (WRN-16-4) was optimized with SGD for 200 epochs with batch size 256. The initial learning rate of 0.1 linearly decays by 0.1 for every 40 epochs.

Method Effectiveness

SADA was compared with ERM, a classification and contrastive semantic alignment method, a conventional generalization method, a conventional domain adaptation method, a conventional data processing method for image classifiers, a first conventional single domain data augmentation method, a second conventional single domain data augmentation method, a third conventional single domain data augmentation method and a fourth conventional single domain data augmentation method. The same model architecture was used for all the approaches.

First Conventional Benchmark Dataset

FIG. 9A is a table showing the 3-run average accuracy of all the methods trained on the conventional database of handwritten digits and evaluated in each target domain, in accordance with example embodiments. All the variants of SADA achieved better accuracy than the baselines. Specifically, significant improvements of 5.50% and 9.08% are observed on the two very challenging target domains, the conventional database of images of house address numbers and the conventional database of digits, respectively. This performance gain mainly contributes to the spectrally augmented samples with large appearance/style variation. As pointed out earlier, adversarial-based methods, such as the first conventional single domain data augmentation method and the second conventional single domain data augmentation method, generate only minor perturbations in the image space to enhance the appearance diversity, and thus could not outperform the random data augmentation methods, such as the third conventional single domain data augmentation method.

Second Conventional Benchmark Dataset

A model was trained in a single source domain and tested on the other three target domains. FIG. 9B is a table showing the 3-run average accuracy and (standard deviation) of models trained in each single domain (the conventional database of photographs, the conventional database of art, the conventional database of cartoons, and the conventional database of sketches), in accordance with example embodiments. (The best performance is shown in bold text.) The proposed SADA variants achieve the best performance in 3 out of the 4 source domains, i.e., the conventional database of photographs, the conventional database of art, and the conventional database of sketches. Both SADA1Mix and SADAnoMix achieved over 3.9% improvement with the conventional database of sketches as the source domain, which contains the largest domain shift from the other three colored domains. In addition, SADA1Mix and SADAnoMix consistently outperform SADA2Mix, which indicates the importance of SADA augmented images. These observations verified that model generalization performance can improve, if SADA is included for suppressing the model's sensitivity.

The Third Conventional Benchmark Dataset

Besides the natural domain shift in the first conventional benchmark dataset and the second conventional benchmark dataset, the method was further evaluated on the image corruption dataset. FIG. 9C is a table showing the 3-run average accuracy and (standard deviation) of models trained on the uncorrupted version of the third conventional benchmark dataset and evaluated on the third conventional benchmark dataset and on four types of corruption under the severest level 5, in accordance with example embodiments. (The best performance is shown in bold text.) The averages accuracy of SADA1Mix surpasses the best baseline (the conventional data processing method for image classifiers) by 2.55%. The results validate that SADA not only handles the natural domain shift but is resilient to artificial corruptions.

Model Sensitivity Perspective

Figure 4A:
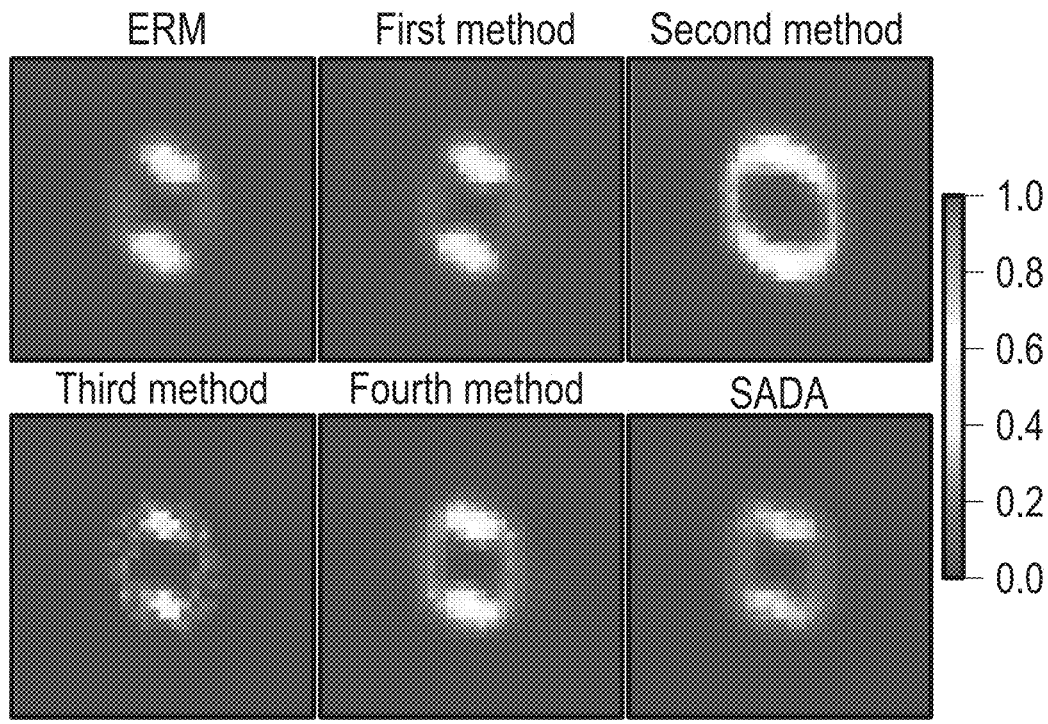
FIGS. 4A and 4B are the original and SADA model sensitivity maps of different single-DG methods, in accordance with example embodiments.
Figure 4B:
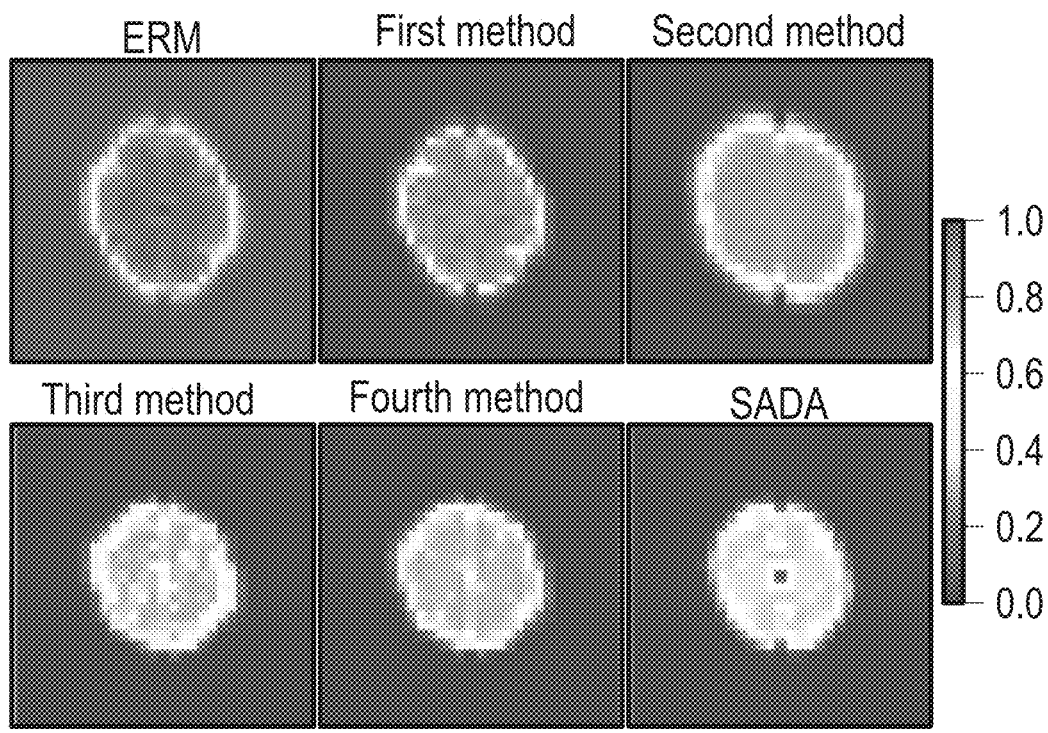
Figure 4C:
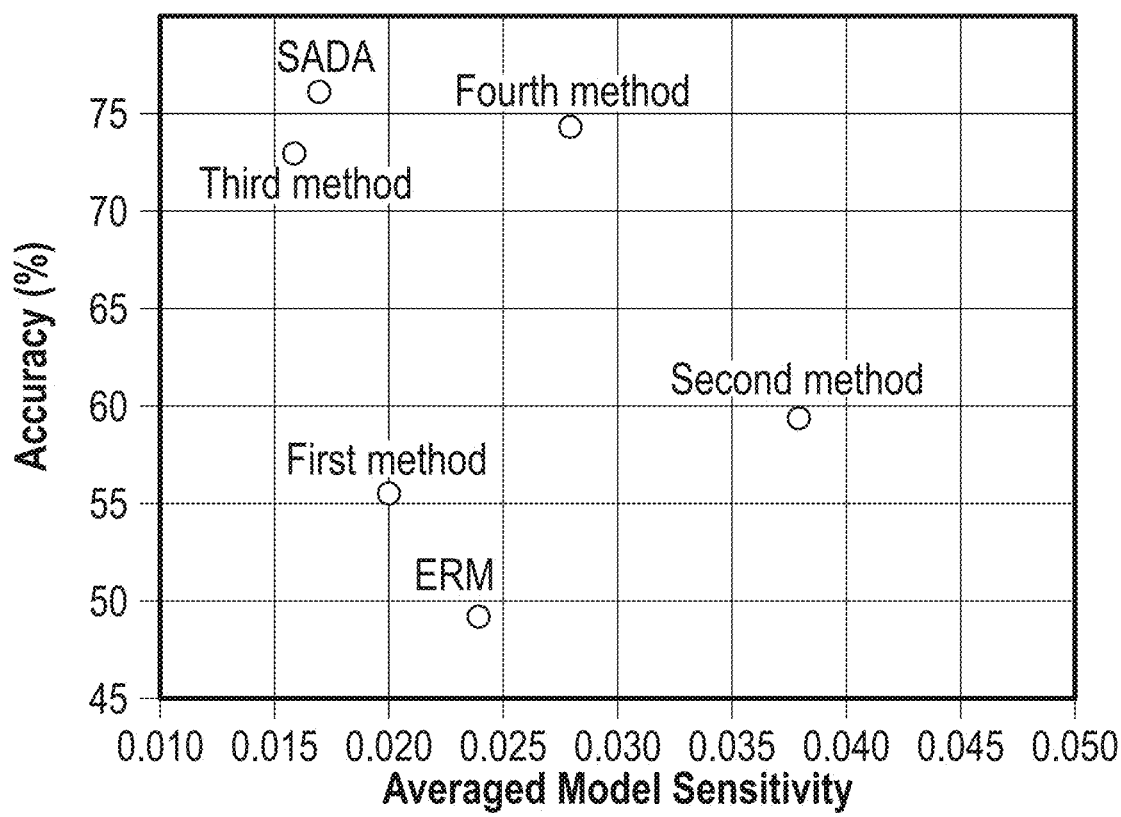
FIGS. 4C and 4D illustrate model performance versus the model sensitivity maps, in accordance with example embodiments.
Figure 4D:
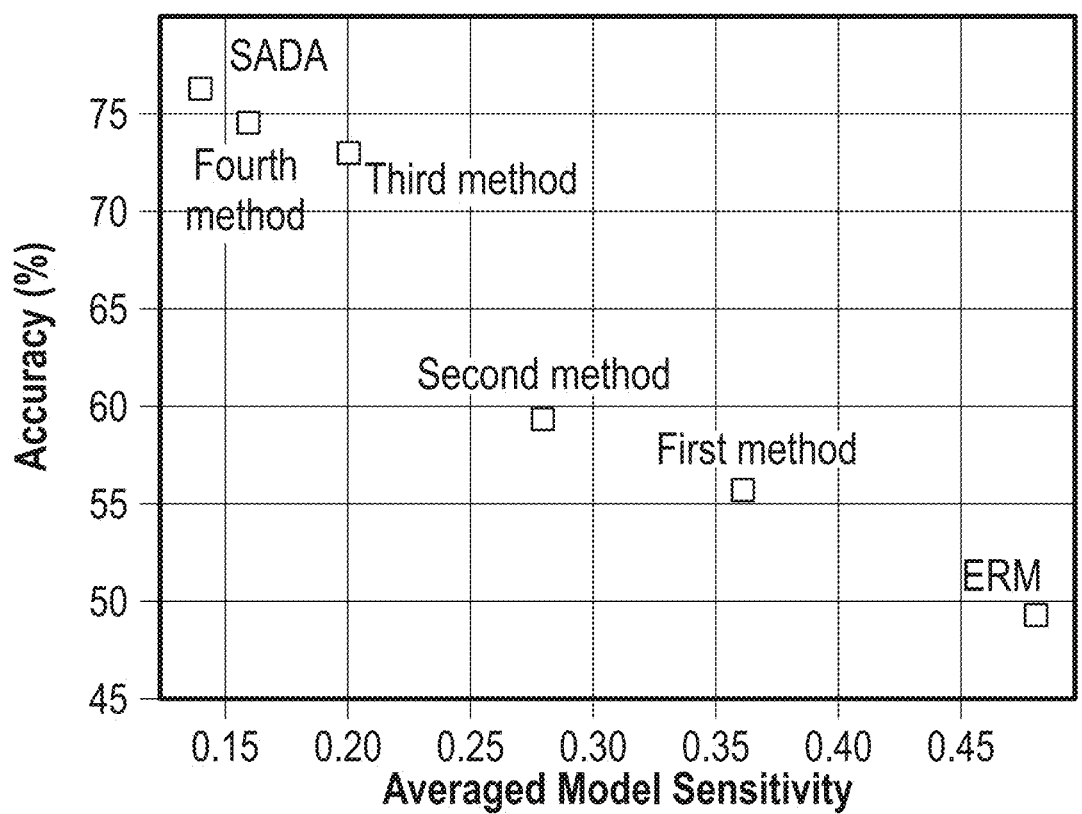

FIGS. 4A and 4B are the original and SADA model sensitivity maps of different single-DG methods, in accordance with example embodiments. FIGS. 4C and 4D illustrate model performance versus the model sensitivity maps, in accordance with example embodiments. To verify whether the enhanced model sensitivity map can indicate the model's generalizability, the sensitivity maps of a convolutional neural network, trained with different strategies on the conventional database of handwritten digits, were computed, as shown by the examples in FIGS. 4A-4C. First, different from the original sensitivity maps (Eq. 2) in FIG. 4A, the enhanced sensitivity maps (Eq. 4) in FIG. 4B show that source models are more vulnerable to the perturbations in the low frequency region. This result matches with the observations in the previous studies, that the models cannot generalize well when the low-frequency amplitude difference between the source and target domains is large. Second, in FIG. 4B, comparing the model sensitivity map of ERM with the sensitivity maps of other single-DG approaches, the disclosed enhanced sensitivity computation clearly shows how the single-DG approaches can help improve model performance by suppressing the model sensitivity, especially in the low-frequency space. To better visualize the observations, the scattering plot of the accuracy versus the averaged $\ell_{1_1}$-norm of model sensitivity map is presented. As shown in FIG. 4C, the original sensitivity computation method fails to correlate the model performance and sensitivity. In contrast, FIG. 4D shows that the enhanced model sensitivity computation provides strong correlation between the model performance and sensitivity. The model prediction accuracy degrades significantly when the $\ell_{1_1}$-norm of model sensitivity maps increases. These results demonstrate that the enhanced model sensitivity map in Eq. 4 could be used for visualizing and quantifying the effect of implicit regularization on model generalizability.

Data Efficiency

Figure 5A:
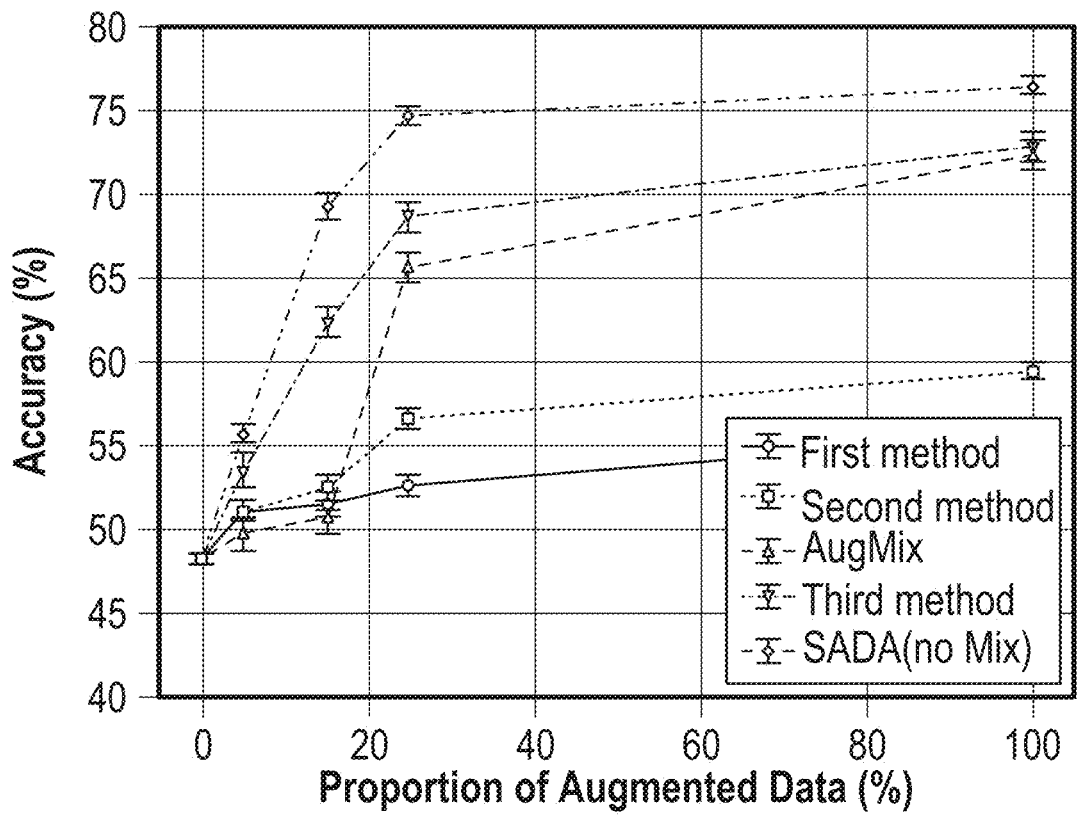
FIGS. 5A and 5B show the analysis results of using a conventional database of handwritten digits and a conventional database of photographs as source domains on the first conventional benchmark dataset and the second conventional benchmark dataset, respectively, in accordance with example embodiments.
Figure 5B:
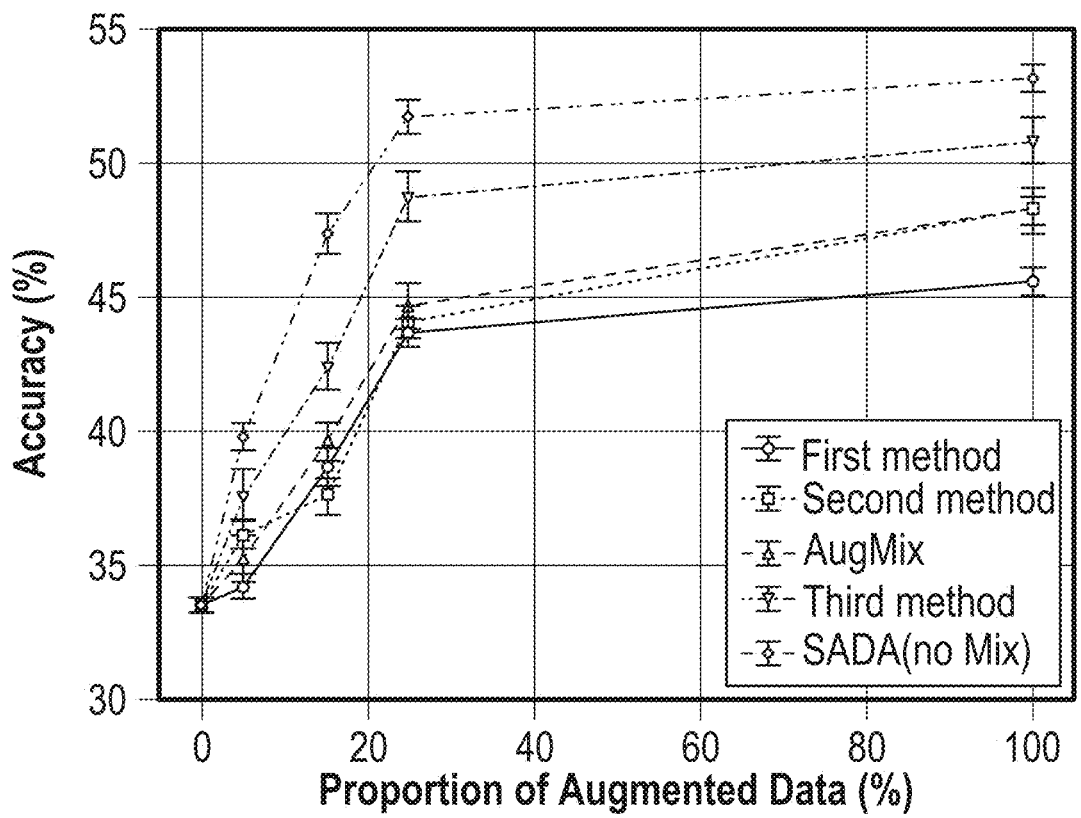

Due to the limited availability of data, data efficiency is an important indicator of data augmentation performance. The model accuracy was evaluated by gradually decreasing the number of augmented images used in the training process. FIGS. 5A and 5B show the analysis results of using a conventional database of handwritten digits and Photo as source domains on the first conventional benchmark dataset and the second conventional benchmark dataset, respectively, in accordance with example embodiments. Exemplary embodiments consistently outperform other baselines when only a proportion of the augmented data are used for training. Also note that, with only 25% augmented data for training, an exemplary embodiment can generalize better than the baselines trained with the fully augmented dataset.

Further Analysis

Ablation Studies

Ablation studies were conducted on both the first conventional benchmark dataset and the second conventional benchmark dataset to verify the effectiveness of each component in SADA. FIG. 9D is a table showing the performance with SADA1Mix on the first conventional benchmark dataset, in accordance with example embodiments.

The two SADA augmented images were first removed (w/o SADA) and the performance degraded more than 20% in all the target domains, which clearly shows the significance of SADA in the whole framework. Second, without the use of a conventional data augmentation method (which uses multiple image operations to augment the images and mixes up all the augmented images) in combination with SADA (identified as SADAnoMix), the model performance decreased by 7% in each target domain. That is because the conventional data augmentation method includes several random image style transfer operations, such as 'solarization' and 'autocontrast,' which diversify the augmented images to complement the targeted spectral augmentation. Third, the performance drop was also observed if the models are trained without the JS divergence, which helps learn invariant representations for improved generalizability.

Effectiveness of Targeted Augmentation

Figure 6:
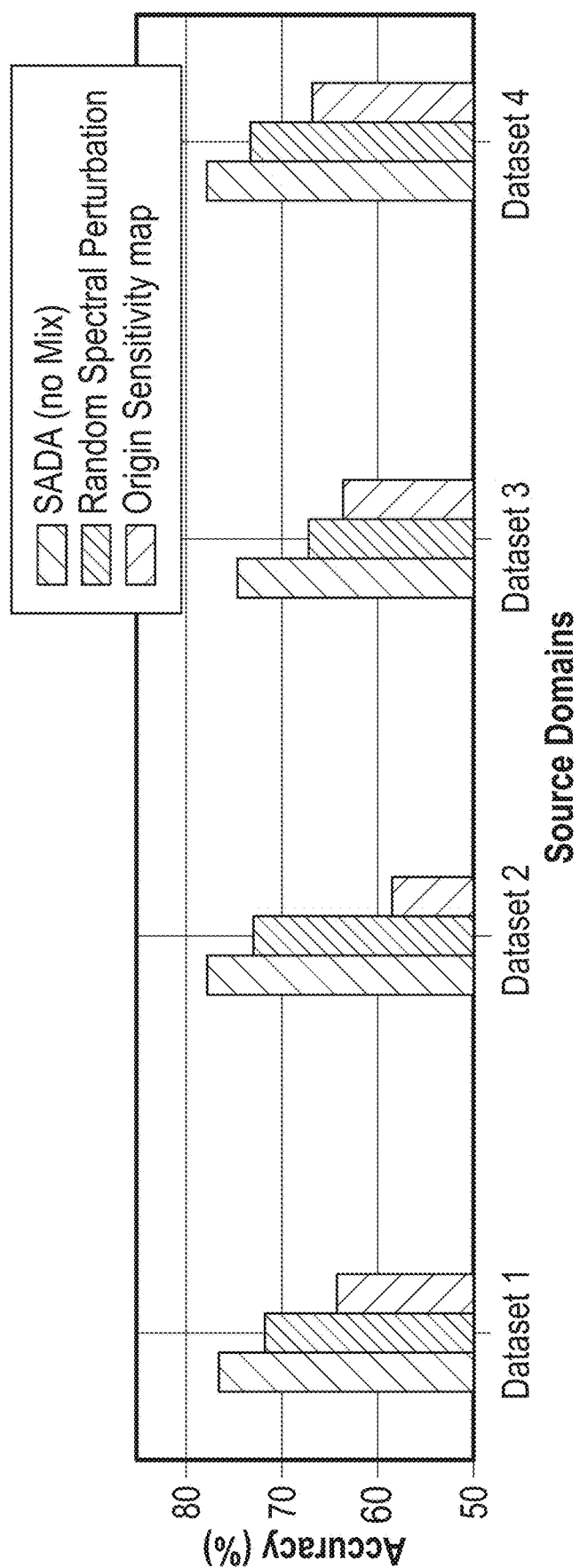
FIG. 6 illustrates a comparison of the performance of SADAnoMix on model sensitivity map and spectral perturbation, in accordance with example embodiments.

The effectiveness of an exemplary model sensitivity map and the targeted adversarial perturbation is described below. The model performance with SADAnoMix was evaluated by 1) using the original model sensitivity map; and 2) replacing the adversarial spectral augmentation with the random spectral perturbation ($\epsilon$=0.2). FIG. 6 presents a comparison of the performance of SADAnoMix on model sensitivity map and spectral perturbation, in accordance with example embodiments. The results in FIG. 6 show that SADAnoMix does not generalize well to unseen domains if the disclosed components are replaced by the two alternative approaches on different source domains.

Hyperparameter Sensitivity Analysis

Figure 7A:
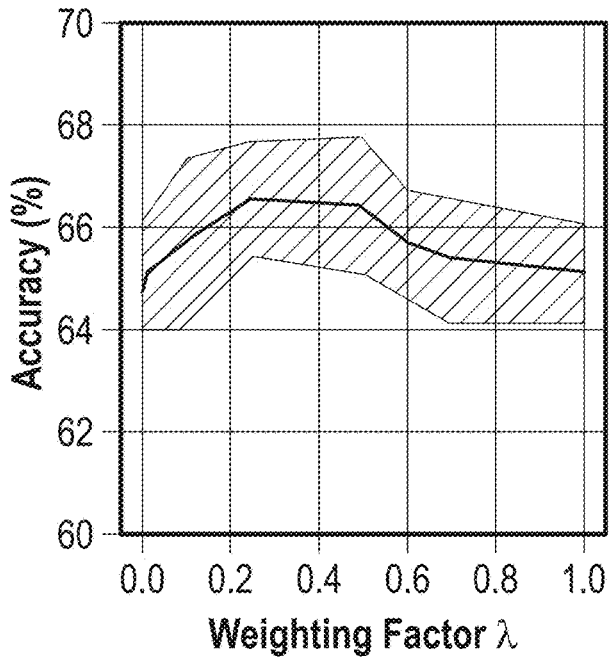
FIGS. 7A-7D illustrate the results of a sensitivity analysis of different hyperparameters, in accordance with example embodiments.
Figure 7B:
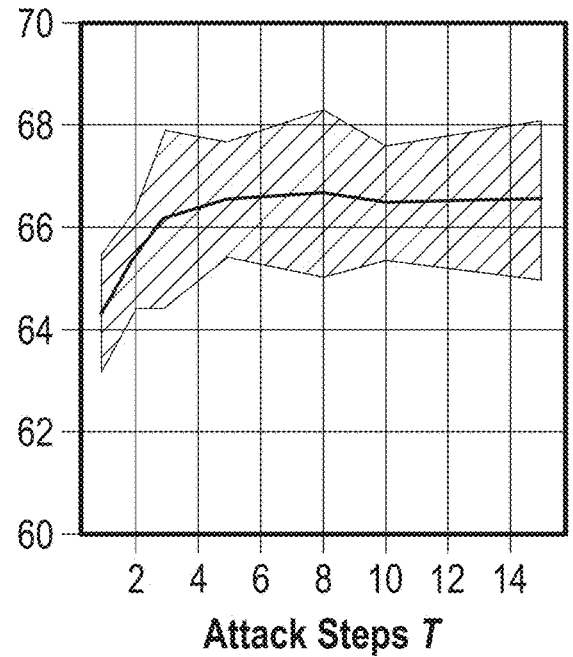
Figure 7C:
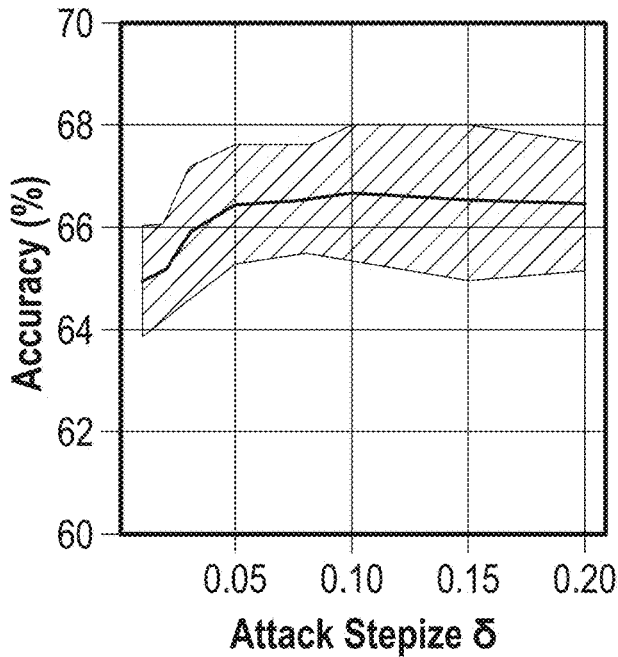
Figure 7D:
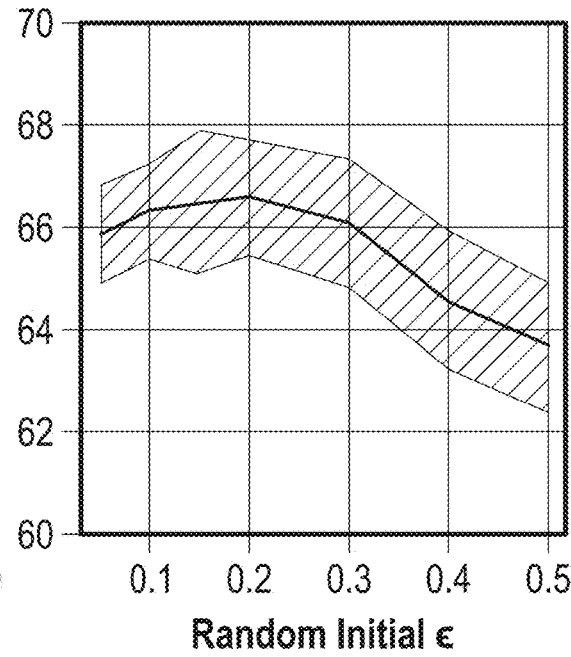

FIGS. 7A-7D illustrate the results of a sensitivity analysis of different hyperparameters, in accordance with example embodiments. To validate the significance of the weighting factor $\lambda$, perturbation steps T and step size $\delta$, and random initialization $\epsilon$, sensitivity analysis of SADA1Mix was conducted on the second conventional benchmark dataset. In the experiments, initial settings included $\lambda$=0.25, T=5, $\delta$=0.08 and $\epsilon$=0.20. When analyzing the sensitivity to one parameter, the other parameters were fixed. When $\lambda$ is within [0.1, 0.6], an exemplary embodiment consistently outperforms other baselines (FIG. 7A). That is due to the balance between the JS loss and the ERM loss. When the perturbation gets stronger, FIGS. 7B and 7C show that the performance increases initially, and then stays stable. It is because the early-stop acceleration is adopted to control the perturbation strength. FIG. 7D shows that the model performance is stable with the perturbation strength $\epsilon$<0.30, which decreases if the randomization gets too strong.

Given the discussion thus far, it will be appreciated that, in general terms, an exemplary method, according to an aspect of the invention, includes the operations of training, using at least one hardware device, a machine learning model using original source domain data through empirical risk minimization; computing, using the at least one hardware device, a model sensitivity map 232; targeting, using the at least one hardware device, each sensitive frequency point on the model sensitivity map 232; employing, using the at least one hardware device, an adversarial technique to generate spectral adversarial images based on the model sensitivity map 232 and augmenting an image amplitude spectrum; mixing, using the at least one hardware device, the generated spectral adversarial images with the original source domain data to finetune the machine learning model; and facilitating deployment of the finetuned machine learning model.

In one example embodiment, the model sensitivity map 232 is a surrogate of model vulnerability in a frequency space.

In one example embodiment, the employing operation encodes model sensitivity into the spectral adversarial images.

In one example embodiment, the step of computing the model sensitivity map 232 uses a source domain amplitude spectrum as a domain prior to enhance the model sensitivity map 232.

In one example embodiment, inferencing is performed in one or more preferred domains using the deployed finetuned machine learning model.

In one example embodiment, the computing, targeting, employing, and mixing operations are repeated using the finetuned machine learning model in place of the machine learning model.

In one example embodiment, the employing the adversarial technique to generate the spectral adversarial images further comprises:

computing a mean amplitude spectrum D by averaging an amplitude spectrum of all images in a source domain;

reformulating an original Fourier basis noise $N_{i,j}$ as defined by $$N_{i,j} = r \cdot D_{i,j} \cdot U_{i,j}; \text{ and}$$

computing an enhanced model sensitivity at frequency (i,j) by evaluating a prediction error rate on the spectral adversarial images as defined by $$M_S(i, j) = 1 - \underset{(x, y) \in X_S}{Acc}(F(x + r \cdot D_{i,j} \cdot U_{i,j}, y)),$$

where F is a model trained with empirical risk minimization (ERM) by minimizing a cross entropy loss $$\mathcal{L}_{ERM} = 1 - \underset{(x, y) \in X_S}{\mathbb{E}} \ell_{CE}(F(x), y),$$

where $U_{i,j}$ is a Fourier basis image and r is a randomly sampled integer. $X_S$ is the whole dataset.

In one example embodiment, the employing the adversarial technique to generate the spectral adversarial images further comprises computing an original spectral amplitude $A_{org}$ and a phase $P_{org}$ on a given source domain image x 350 using a Fast Fourier Transform (FFT) 354 as $A_{org},P_{org}$=FFT[x] and initializing the original amplitude spectrum $A_{org}$ with a random perturbation as $A_0=A_{org}\odot(1+\text{Unif}(-\epsilon,\epsilon))$FFT[x] where Unif$(-\epsilon,\epsilon)\in \mathbb{R}^{w\times h}$ represents a two-dimensional (2D) matrix with each entry sampled uniformly from $[-\epsilon,\epsilon]$, and $\odot$ denotes a Hadamard product. The skilled person can select $\epsilon$ given the teachings herein, e.g., heuristically, based on the domain of interest.

In one example embodiment, the employing the adversarial technique to generate the spectral adversarial images further comprises iteratively optimizing an amplitude spectrum $A_{t+1}$ by adding a $M_S$-weighted sign gradient of a cross-entropy loss to the amplitude spectrum $A_t$ with $\delta$ as a perturbation step size to target each sensitive frequency component (Eq. 7), $$A_{t+1} = A_t + \delta \cdot \text{sign}\left[\frac{\partial \ell_{CE}(F(FFT[A_t, P_{org}])), y}{\partial A_t}\right] \odot M_S;$$

adversarially perturbing the amplitude spectrum $A_t$ while keeping an original phase spectrum; and clamping a reconstructed image into a definition region [0, 1] by $x_t+1$=Clamp(FFT[A $t_{+1},P_{org}$], 0,1).

In one example embodiment, the finetuning the machine learning model further comprises regularizing a prediction consistency among an original image and all augmented images through a Jensen-Shannon (JS) divergence to learn invariant representations, wherein a total training loss is $$\mathcal{L} = \mathcal{L}_{ERM} + \lambda \cdot JS(x_0, x_1, x_2, \ldots, x_n),$$

wherein $\lambda$ is a trade-off parameter and $x_1, x_2, \ldots, x_n$ are n augmented images from a same original image $x_0$, wherein the Jensen-Shannon divergence is defined as $$JS(x_0, x_1, x_2, \ldots, x_n) = \frac{1}{n+1} \sum_{i=0}^{n} KL(F(x_i \| \overline{p})),$$

where KL is a Kullback-Leibler divergence, $F(x_i)$ is a model prediction probability of $x_i$ and $$\overline{p} = \frac{1}{n+1} \sum_{i=0}^{n} F(x_i).$$

In one aspect, a computer program product comprises one or more tangible computer-readable storage media and program instructions stored on at least one of the one or more tangible computer-readable storage media, the program instructions executable by a processor, the program instructions comprising training a machine learning model using original source domain data through empirical risk minimization; computing a model sensitivity map 232; targeting each sensitive frequency point on the model sensitivity map 232; employing an adversarial technique to generate spectral adversarial images based on the model sensitivity map 232 and augmenting an image amplitude spectrum; mixing the generated spectral adversarial images with the original source domain data to finetune the machine learning model; and facilitating deployment of the finetuned machine learning model.

In one aspect, an apparatus comprises a memory and at least one processor, coupled to the memory, and operative to perform operations comprising training a machine learning model using original source domain data through empirical risk minimization; computing a model sensitivity map 232; targeting each sensitive frequency point on the model sensitivity map 232; employing an adversarial technique to generate spectral adversarial images based on the model sensitivity map 232 and augmenting an image amplitude spectrum; mixing the generated spectral adversarial images with the original source domain data to finetune the machine learning model; and facilitating deployment of the finetuned machine learning model.

Figure 10:
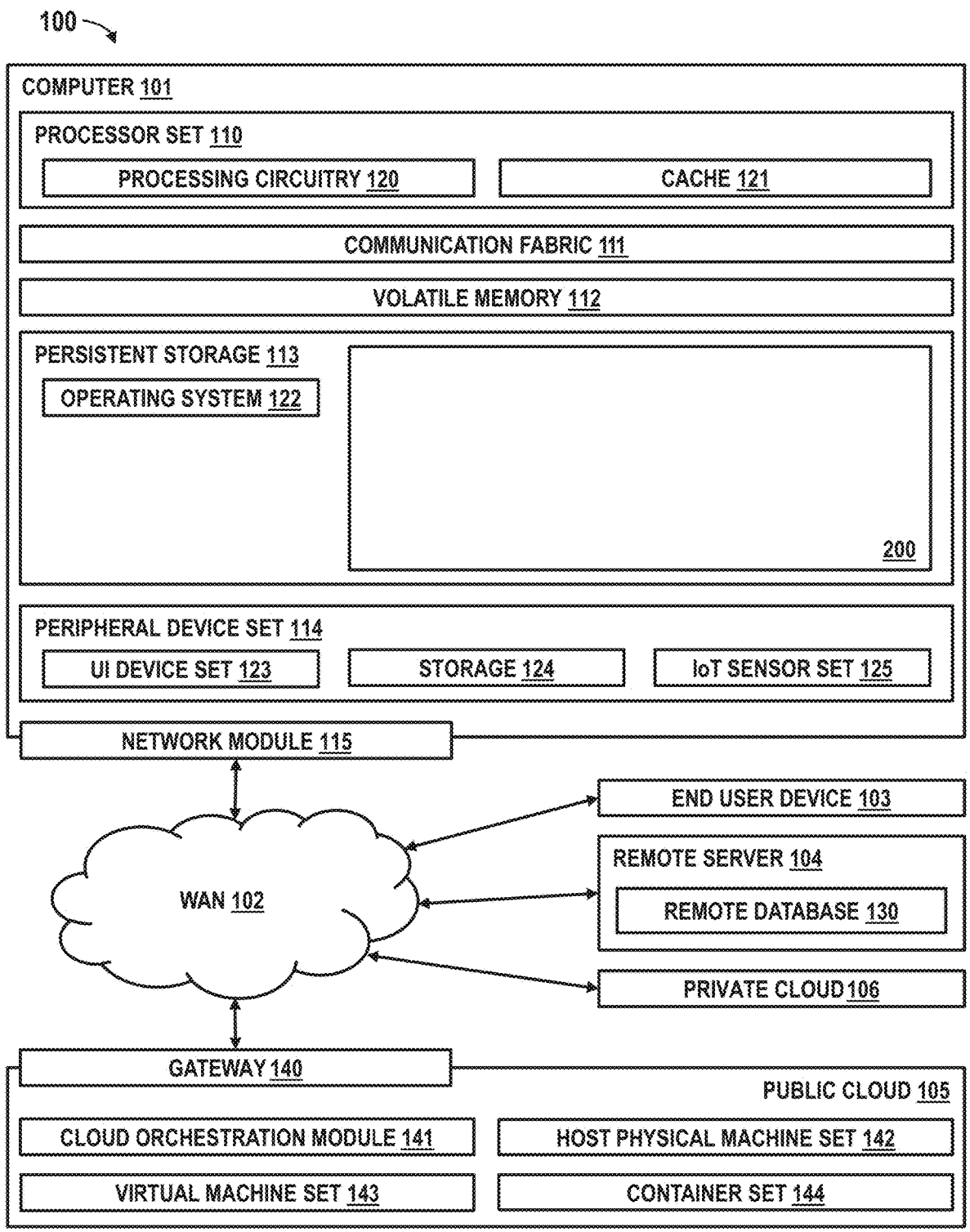
FIG. 10 depicts a computing environment according to an embodiment of the present invention.

Refer now to FIG. 10.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as single domain generalization system 200 for generalizing neural networks (the single domain generalization system 200 performs data augmentation followed by retraining the neural network to be more generalized; block 200 could also include an implementation of the neural network itself). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   training, using at least one hardware device, a machine learning model using original source domain data through empirical risk minimization;
   computing, using the at least one hardware device, a model sensitivity map;
   targeting, using the at least one hardware device, each sensitive frequency point on the model sensitivity map;
   employing, using the at least one hardware device, an adversarial technique to generate spectral adversarial images based on the model sensitivity map and augmenting an image amplitude spectrum;
   mixing, using the at least one hardware device, the generated spectral adversarial images with the original source domain data to finetune the machine learning model; and
   facilitating deployment of the finetuned machine learning model.

2. The method of claim 1, wherein the model sensitivity map is a surrogate of model vulnerability in a frequency space.

3. The method of claim 1, wherein the employing operation encodes model sensitivity into the spectral adversarial images.

4. The method of claim 1, wherein the step of computing the model sensitivity map uses a source domain amplitude spectrum as a domain prior to enhance the model sensitivity map.

5. The method of claim 1, further comprising performing inferencing in one or more preferred domains using the deployed finetuned machine learning model.

6. The method of claim 1, further comprising repeating the computing, targeting, employing, and mixing operations using the finetuned machine learning model in place of the machine learning model.

7. The method of claim 1, wherein the employing of the adversarial technique to generate the spectral adversarial images comprises:

computing a mean amplitude spectrum D by averaging an amplitude spectrum of all images in a source domain;

reformulating an original Fourier basis noise $N_{i,j}$ as defined by $$N_{i,j} = r \cdot D_{i,j} \cdot U_{i,j}; \text{ and}$$

computing an enhanced model sensitivity at frequency (i,j) by evaluating a prediction error rate on the spectral adversarial images as defined by $$M_S(i, j) = 1 - \underset{(x, y) \in X_S}{Acc} (F(x + r \cdot D_{i,j} \cdot U_{i,j}, y)),$$

where F is a model trained with empirical risk minimization (ERM) by minimizing a cross entropy loss $$\mathcal{L}_{ERM} = 1 - \underset{(x, y) \in X_S}{\mathbb{E}} \ell_{CE}(F(x), y),$$

where $U_{i,j}$ is a Fourier basis image, r is a randomly sampled integer, and $X_S$ is a whole dataset.

8. The method of claim 1, wherein the employing of the adversarial technique to generate the spectral adversarial images comprises computing an original spectral amplitude $A_{org}$ and a phase $P_{org}$ on a given source domain image x using a Fast Fourier Transform (FFT) as $A_{org}, P_{org} = FFT[x]$ and initializing the original amplitude spectrum $A_{org}$ with a random perturbation as $A_0 = A_{org} \odot (1 + Unif(-\epsilon, \epsilon)) FFT[x]$ where $Unif(-\epsilon, \epsilon) \in \mathbb{R}^{w \times h}$ represents a two-dimensional (2D) matrix with each entry sampled uniformly from $[-\epsilon, \epsilon]$, and $\odot$ denotes a Hadamard product.

9. The method of claim 1, wherein the employing of the adversarial technique to generate the spectral adversarial images comprises iteratively optimizing an amplitude spectrum $A_{t+1}$ by adding a $M_S$-weighted sign gradient of a cross-entropy loss to the amplitude spectrum $A_t$ with $\delta$ as a perturbation step size to target each sensitive frequency component, $$A_{t+1} = A_t + \delta \cdot sign\left[\frac{\partial \ell_{CE}(F(FFT[A_t, P_{org}])), y)}{\partial A_t}\right] \odot M_S;$$

adversarially perturbing the amplitude spectrum $A_t$ while keeping an original phase spectrum; and clamping a reconstructed image into a definition region [0, 1] by $x_t+1 = Clamp(FFT[A_{t+1}, P_{org}], 0, 1)$.

10. The method of claim 1, wherein the finetuning of the machine learning model comprises regularizing a prediction consistency among an original image and all augmented images through a Jensen-Shannon (JS) divergence to learn invariant representations, wherein a total training loss is $$\mathcal{L} = \mathcal{L}_{ERM} + \lambda \cdot JS(x_0, x_1, x_2, \ldots, x_n),$$

wherein $\lambda$ is a trade-off parameter and $x_1, x_2, \ldots, x_n$ are n augmented images from a same original image $x_0$, wherein the Jensen-Shannon divergence is defined as $$JS(x_0, x_1, x_2, \ldots, x_n) = \frac{1}{n+1} \sum_{i=0}^{n} KL(F(x_i) \| \overline{p})),$$

where KL is a Kullback-Leibler divergence, $F(x_i)$ is a model prediction probability of $x_i$ and $$\overline{p} = \frac{1}{n+1} \sum_{i=0}^{n} F(x_i).$$

11. A computer program product, comprising:
one or more tangible computer-readable storage media and program instructions stored on at least one of the one or more tangible computer-readable storage media, the program instructions executable by a processor, the program instructions comprising:
training a machine learning model using original source domain data through empirical risk minimization;
computing a model sensitivity map;
targeting each sensitive frequency point on the model sensitivity map;
employing an adversarial technique to generate spectral adversarial images based on the model sensitivity map and augmenting an image amplitude spectrum;
mixing the generated spectral adversarial images with the original source domain data to finetune the machine learning model; and
facilitating deployment of the finetuned machine learning model.

12. A system comprising:
a memory; and
at least one processor, coupled to said memory, and operative to perform operations comprising:
training a machine learning model using original source domain data through empirical risk minimization;
computing a model sensitivity map;
targeting each sensitive frequency point on the model sensitivity map;
employing an adversarial technique to generate spectral adversarial images based on the model sensitivity map and augmenting an image amplitude spectrum;
mixing the generated spectral adversarial images with the original source domain data to finetune the machine learning model; and
facilitating deployment of the finetuned machine learning model.

13. The system of claim 12, wherein the model sensitivity map is a surrogate of model vulnerability in a frequency space.

14. The system of claim 12, wherein the employing operation encodes model sensitivity into the spectral adversarial images.

15. The system of claim 12, wherein the step of computing the model sensitivity map uses a source domain amplitude spectrum as a domain prior to enhance the model sensitivity map.

16. The system of claim 12, the operations further comprising performing inferencing in one or more preferred domains using the deployed finetuned machine learning model.

17. The system of claim 12, the operations further comprising repeating the computing, targeting, employing, and mixing operations using the finetuned machine learning model in place of the machine learning model.

18. The system of claim 12, wherein the employing the adversarial technique to generate the spectral adversarial images further comprises:

computing a mean amplitude spectrum D by averaging an amplitude spectrum of all images in a source domain;

reformulating an original Fourier basis noise $N_{i,j}$ as defined by $$N_{i,j} = r \cdot D_{i,j} \cdot U_{i,j}; \text{ and}$$

computing an enhanced model sensitivity at frequency (i,j) by evaluating a prediction error rate on the spectral adversarial images as defined by $$M_S(i, j) = 1 - \underset{(x, y) \in X_S}{Acc}(F(x + r \cdot D_{i,j} \cdot U_{i,j}, y)),$$

where F is a model trained with empirical risk minimization (ERM) by minimizing a cross entropy loss $$\mathcal{L}_{ERM} = 1 - \underset{(x, y) \in X_S}{\mathbb{E}} \ell_{CE}(F(x), y),$$

where $U_{i,j}$ is a Fourier basis image, r is a randomly sampled integer, and $X_S$ is a whole dataset.

19. The system of claim 12, wherein the employing the adversarial technique to generate the spectral adversarial images further comprises computing an original spectral amplitude $A_{org}$ and a phase $P_{org}$ on a given source domain image x using a Fast Fourier Transform (FFT) as $A_{org}$, $P_{org}$=FFT[x] and initializing the original amplitude spectrum $A_{org}$ with a random perturbation as $A_0 = A_{org} \odot (1 + \text{Unif}(-\epsilon, \epsilon))\text{FFT}[x]$ where $\text{Unif}(-\epsilon, \epsilon) \in \mathbb{R}^{w \times h}$ represents a two-dimensional (2D) matrix with each entry sampled uniformly from $[-\epsilon, \epsilon]$, and $\odot$ denotes a Hadamard product.

20. The system of claim 12, wherein the employing the adversarial technique to generate the spectral adversarial images further comprises:

iteratively optimizing an amplitude spectrum $A_{t+1}$ by adding a $M_S$-weighted sign gradient of a cross-entropy loss to the amplitude spectrum $A_t$ with $\delta$ as a perturbation step size to target each sensitive frequency component, $$A_{t+1} = A_t + \delta \cdot \text{sign}\left[\frac{\partial \ell_{CE}(F(FFT[A_t, P_{org}])), y}{\partial A_t}\right] \odot M_S;$$

adversarially perturbing the amplitude spectrum $A_t$ while keeping an original phase spectrum; and clamping a reconstructed image into a definition region [0, 1] by $x_t + 1 = \text{Clamp}(FFT[A_{t+1}, P_{org}], 0, 1)$.

* * * * *